United States Patent [19]

Merhav

[11] 4,244,215
[45] Jan. 13, 1981

[54] AUTONOMOUS NAVIGATION SYSTEM

[76] Inventor: Robert A. Frosch, Administrator of the National Aeronautics and Space Administration, with respect to an invention of Shmuel J. Merhav, Haifa, Israel

[21] Appl. No.: 78,611

[22] Filed: Sep. 24, 1979

[51] Int. Cl.³ .......................... G01C 22/02; G01P 9/02
[52] U.S. Cl. ..................................... 73/178 R; 73/490; 73/504
[58] Field of Search ................. 73/178 R, 504, 503, 73/490; 364/449, 453; 74/5.34, 5.4, 5.41, 5.47

[56] References Cited

U.S. PATENT DOCUMENTS

| | | | |
|---|---|---|---|
| 2,770,452 | 11/1956 | Miller | 73/504 |
| 2,811,043 | 10/1957 | Bonnell | 73/504 X |
| 3,071,008 | 1/1963 | Steele | 73/517 B |
| 3,077,783 | 2/1963 | Stiles et al. | 73/517 B |

Primary Examiner—James J. Gill
Attorney, Agent, or Firm—Darrell G. Brekke; John R. Manning; Armand McMillan

[57] ABSTRACT

An inertial navigation system utilizing a servo-controlled two-degree of freedom pendulum to obtain specific force components in the locally level coordinate system. The pendulum includes a leveling gyroscope and an azimuth gyroscope supported on a two-gimbal system. The specific force components in the locally level coordinate system are converted to components in the geographical coordinate system by means of a single Euler transformation. The standard navigation equations are solved to determine longitudinal and lateral velocities. Finally, vehicle position is determined by a further integration.

11 Claims, 2 Drawing Figures

AUTONOMOUS NAVIGATION SYSTEM

ORIGIN OF THE INVENTION

The invention described herein was made in the performance of work under a NASA contract and is subject to the provisions of Section 305 of the National Aeronautics and Space Act of 1958, Public Law 85-568 (72 Stat. 435; 42 U.S.C. 2457).

TECHNICAL FIELD

The invention relates to navigation systems and more particularly to those utilizing inertial instrumentation.

BACKGROUND ART

In spite of the abundance and sophistication of radio navigation systems available today, it is not unusual for an aircraft during a long flight mission to be occasionally cut off from radio navigation signals for significant periods. Although a self-contained inertial navigation system would alleviate such a problem, such systems are just too expensive for many aircraft owners. Known inertial navigation systems capable of an accuracy of one nautical mile per hour cannot be implemented at prices low enough to attract general aviation customers. Present day inertial navigation systems of the 1 nm/hr class cost in the $50,000–$100,000 range.

Conventional inertial navigation systems are based on measurement and double integration of the linear accelerations of the vehicle. In one class of systems a plurality of orthogonally disposed accelerometers are mounted on a gyroscopically stabilized platform that is supported by three, four or even five gimbals. A key element in the development of this inertial system has been the stabilized platform on which the accelerometers are mounted and whose attitude is controlled by the gyroscopes. The platform performs two critical functions. It establishes a coordinate system for the accelerometers and isolates them from angular motions of the vehicle. The first function simplifies navigation computations while the second simplifies computations as well as sensor design. The accelerometers must be precisely horizontally aligned. If they have any tilt, they record acceleration due to gravity and this is added to the measured horizontal acceleration. As the effect of gravity is continuous and provides an acceleration that is usually larger than that experienced by the aircraft, accelerometer misalignment may cause considerable errors. For example, if an accelerometer sensed 0.1% of the gravity field, double integration of that acceleration would produce approximately an 18-mile position error after a minute of flight. A representative gimballed inertial system is described in "Guidance System," U.S. Pat. No. 3,104,545, C. S. Draper et al., Sept. 24, 1963.

In another class of systems, known as strapdown inertial navigation systems, a plurality of orthogonally displaced gyros and a plurality of orthogonally aligned accelerometers are strapped directly to the airframe. In the strapdown inertial system the stable platform is replaced by two computer functions: one to establish a coordinate reference based on the gyro outputs and the other to transform the accelerometer outputs into the established coordinate frame. The strapdown sensor must operate to the same order of accuracy as its platform counterpart. The angular rate regime for the strapdown sensor is in deg/sec instead of the deg/hr category for a stable platform sensor. The major design impact is of course on the gyro rather than the accelerometer, as the former must measure the rates very precisely. The dynamic range for the gyro could, for example, begin at a threshold of 0.01 deg/hr and extend to the area of 100 deg/sec or so, for a span of about $10^7$ compared with a $10^4$ span in gimballed platforms.

Efforts to improve reliability and to reduce the cost and size of inertial navigation systems have, in the past decade, been largely directed to strapdown systems. "Strapdown Navigation Technology: A Literature Survey," Garg et al., *AIAA Journal of Guidance and Control*, Vol. 1, No. 3, May-June 1978, pp. 161–172. In strapdown systems the advantages gained from dispensing with gimbals are largely off-set by the increased demands placed on the gyroscopes and the computational apparatus. The greater sensitivity of strapdown systems to alignment errors, and to correlated noise components in the accelerometers and gyroscopes, have so far impeded their successful competition with gimballed systems in the 1 nm/hr class. "Advantages of Gimballed Inertial Navigation Systems," Roland Peterson, Proceedings of the IEEE 1976 National Aerospace and Electronics Conference, pp. 508–514.

A few departures from the aforementioned types of inertial systems have been noted. The article "Kalman Filter Divergence and Aircraft Motion Estimators," A. E. Bryson, *AIAA Journal of Guidance and Control*, Vol. 1, No. 1, Jan.-Feb. 1978, pp. 71–79, describes a method of estimating velocities from measurements of roll rate, pitch rate, heading and altitude. Although it may have possibilities for short-term navigation, further work is needed in the areas of parameter variation sensitivity, trim error and wind modeling. Hector ("The RAMP Inertial Navigation System," *Philips Technical Review*, Vol. 29, 1968, No. 3/4, pp. 69–85) discloses an inertial system in which two single-axis pendulums are supported and orthogonally aligned on a stabilized platform. Displacement of the vehicle is determined by twice integrating the angular acceleration of each pendulum. Monaco et al., ("Schuler Tuned Vertical Indicating System," *AIAA Journal of Guidance and Control*, Vol. 1, No. 6, Nov.-Dec. 1978, pp. 413–419) show a gyro-less, vertically-oriented, single-axis pendulum that they say can be employed in a navigation system. The motion of the single-axis pendulum is sensed by an angular accelerometer. The sensor output is amplified and fed to a torque generator that positions the pendulum. Both Hector and Monaco suggest that their pendulums be Schuler tuned by artificially increasing the moment of inertia by a factor of the order of $10^8$. Such a scheme calls for each torque generator to be preceeded by an amplifier with a gain of approximately $10^7$. The problems attendant with such a massive gain (stability, noise, etc.) raise doubts as to how such systems would perform in an actual flight environment. For example, if the amplifier input noise or gyro pick-off noise were only 10 $\mu v$, the amplifier would easily be saturated and would induce a large extraneous torque in the pendulum.

DISCLOSURE OF INVENTION

It is, therefore, an object of this invention to provide an improved low-cost autonomous navigation system that departs from conventional gimballed and strapdown inertial systems.

Another object of the subject invention is to provide a stable acceleration-insensitive accurate local vertical reference.

A still further object of the present invention is to provide longitudinal and lateral vehicular specific force measurements in the locally level plane irrespective of the vehicle pitch, roll and yaw motions.

A still further object of this invention is to provide longitudinal and lateral velocities in locally level geographic coordinates along with vehicle position, altitude and attitude information.

A still further object of the instant invention is to minimize the number of sensors and system complexity and thus reduce errors and alignment procedures.

A still further object of this invention is to provide a simple and rapid north calibration procedure.

The objects of this invention are achieved by an unbalanced, pendulous, two-axis gimbal system wherein the outer gimbal is strapped to the longitudinal axis of the vehicle and the inner gimbal supports a two-degree of freedom leveling gyroscope and a heading gyroscope. The rate signals measured by the leveling gyroscope are integrated, amplified and fed to gimbal torquers. The axis of the pendulum is maintained coincident with the local vertical and the outputs of the amplifiers are proportional to the longitudinal and lateral vehicular specific forces in the locally level plane irrespective of vehicle pitch, roll and yaw motions. The specific force components in the locally level coordinate system are converted to components in the geographical coordinate system by means of a single Euler transformation. The standard navigation equations are solved to determine longitudinal and lateral velocities in the geographical coordinate system, and finally vehicle position is determined by a further integration. Vehicle velocity, altitude, position and attitude measurements can be simultaneously presented on a display. The heading gyroscope is calibrated simply and quickly with a single resolver operation.

An important feature of the invention is that it enables considerable savings in sensors, mechanization and computational volume and speed. Only two inertial sensors are needed and error sources such as accelerometer bias and alignment errors are obviated. The gyroscopic inertial measurement unit provides a stable and accurate local vertical reference that is insensitive to acceleration and roll, pitch, and yaw motions.

DETAILED DESCRIPTION OF THE INVENTION

Figure 1:
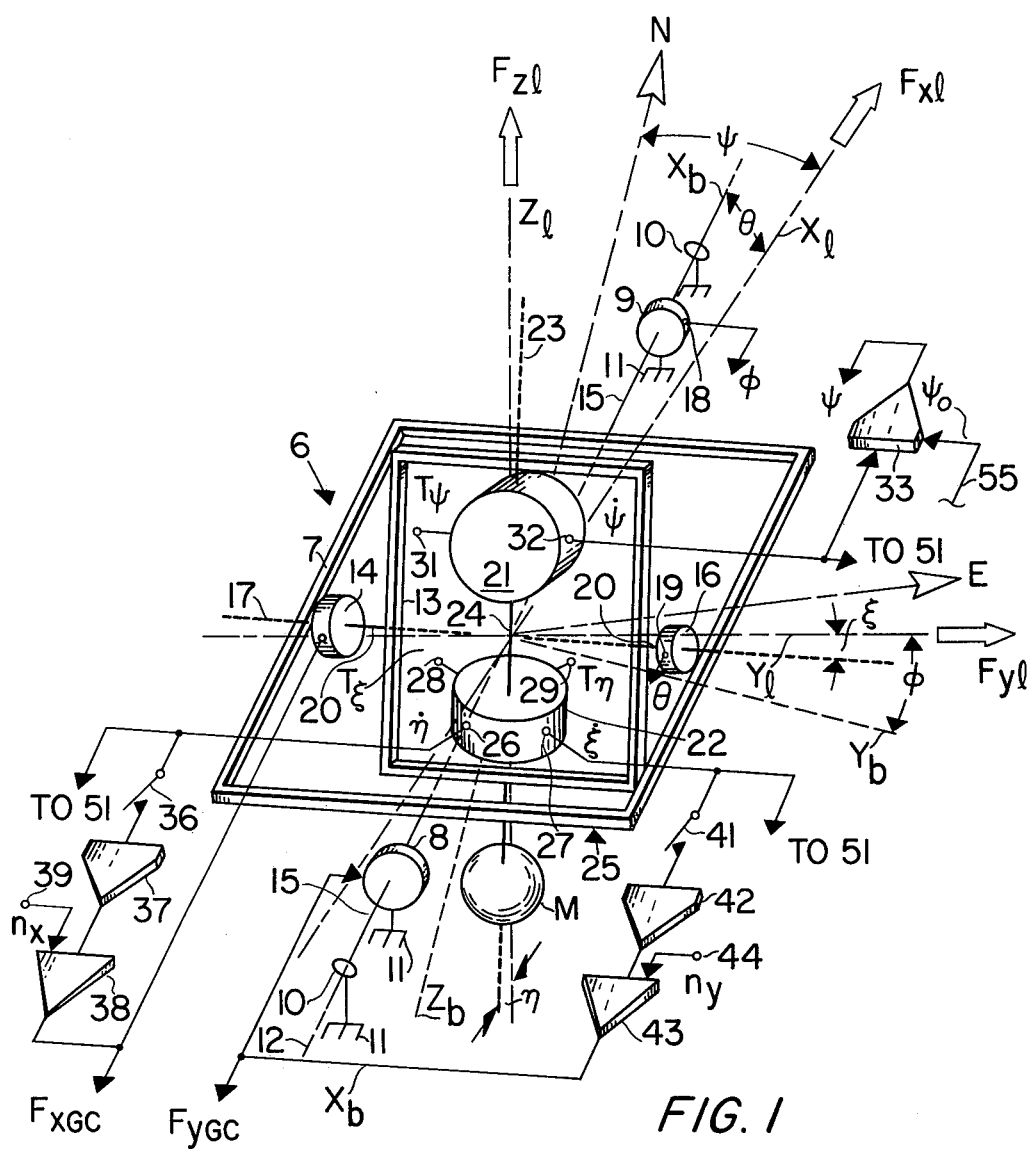
FIG. 1 is a schematic and perspective illustration of the gyroscopic inertial measurement unit in accordance with the principles of the present invention.

Referring now to the drawings, the gyroscopic inertial measurement unit (GIMU) 6 of the present invention is depicted schematically and perspectively in FIG. 1. An outer gimbal 7 with shafts 15 is rotatably supported in bearings 10 which are secured to aircraft frame 11. The rotors of torque generator 8 and signal generator 9 are secured to shafts 15. The aircraft in which the GIMU 6 is utilized has an orthogonal coordinate frame $x_b$, $y_b$, $z_b$ wherein $x_b$, $y_b$, and $z_b$ represent the roll, pitch and yaw axes, respectively. Gimbal axis 12 is positioned coaxially with axis $x_b$ (the longitudinal and roll axis of the aircraft). The axis of rotation 17 of inner gimbal 13 is normal to outer gimbal axis 12. Each gimbal shaft 20 has an end secured to gimbal 13 and an end rotatably supported in a bearing (not illustrated) in gimbal 12. The rotors of signal generator 16 and torque generator 14 are fastened to shafts 20 and the stators of these generators are secured to gimbal 7. It is desirable that the gimbal bearings be of the low friction class and that torque generators 8 and 14 be relatively powerful torquers that have as much torque capacity as those typically found in vertical gyroscopes. Signal generators 9 and 16 may be, for example, low friction synchrotype pick-off generators. The signal on output 18 of signal generator 9 is representative of the aircraft roll angle $\phi$. As will become clearer later, the signal of output 19 of signal generator 16 is representative of the aircraft pitch angle $\theta$.

Gyroscopes 21 and 22 and mass M are secured to inner gimbal 13 and disposed along a common axis 23 which is normal to axis 17 and passes through point 24, the point where axes 12 and 17 intersect. Although gyroscope 22 is shown between gyroscope 21 and mass M, it is to be understood that the positions of gyroscopes 21 and 22 may be interchanged. The center of gravity of the combination comprising gimbals 12, 13, gyroscopes 21, 22 and mass M is below axis intersection point 24. The combination acts as a two-axis pendulum 25 and a servo system maintains the pendulum axis coincident with the local vertical. Mass M can be dispensed with if the center of gravity of pendulum 25 is below point 24. A suitable pendulosity to achieve adequate null point precision during north calibration and subsequent operation would be in the order of 200 gram-cm. Gyroscope 22 is a two-degree-of-freedom gyroscope having two rate signal outputs, two torquers and a rotor with a spin axis coaxial with axis 23. It is hereinafter referred to as the leveling gyroscope and gyroscope 21 is called the azimuth gyroscope. Signals $\eta$ and $\xi$ are generated at outputs 26 and 27, respectively. Torque compensation signals $T_\xi$ and $T_\eta$ are applied to gyro torquer input terminals 28 and 29, respectively. Gyroscope 21 is a one-degree-of-freedom gyroscope with a torquer, a rate signal output and a rotor with a spin axis orthogonal to axis 23. A torque compensation signal $T_\psi$ is applied to torquer input terminal 31 and a pick-off signal $\psi$ is developed at gyro terminal output 32 and coupled to the input of integrator 33. A heading signal $\psi_o$ is inputed to the integrator via lead 55 and establishes the initial value of the heading measurement. The output of amplifier 33 is proportional to heading angle $\psi$, the angle subtended between axis $x_I$ and true north (N).

Comparing gyroscopes 21 and 22, gyroscope 21 requires a larger angular rate regime than gyroscope 22. On the other hand, gyroscope 21 need not have as low a drift rate as gyroscope 22. Preferably, gyroscopes 21 and 22 will be of the dry-tuned-rotor (DTR) variety. DTR gyros normally have two rate signal outputs and two torquers. Thus, if a DTR gyro is used for gyroscope 21, the second signal output and second torquer will not be utilized. Dry-tuned-rotor gyroscopes are described, for example, in the following articles: (1) Craig, R. J. G., "Theory of Operation of an Elastically Supported Tuned Gyroscope," IEEE Transactions on Aerospace and Electronic Systems, Vol. AES-8, May 1972, pp. 280–288; (2) "Investigation of Application of Two Degree of Freedom Dry Tuned Gimbal Gyroscope to Strapdown Navigation Systems," NASA CR-132419, April 1974.

The gyro output signal $\eta$ developed at terminal 26 is fed through switch 36, integrated in integrator 37 and amplified by summing amplifier 38. The output of amplifier 38 is connected to torquer generator 14 and other circuitry that will be discussed below. Similarly, gyro output signal ξ is fed through a switch 41, is integrated in integrator 42 and amplified in summing amplifier 43. The amplifier output is coupled to torque generator 8 and other circuitry that will be described later. The other inputs of amplifiers 38 and 43 receive nulling-/compensation signals $n_x$ and $n_y$, respectively from circuit 51.

The gyroscopic inertial measurement unit 6 performs as a two-axis horizontally stabilized specific force sensor capable of measuring locally level force components irrespective of the vehicle body axis system orientation. These force components, when further processed, enable the determination of the vehicle's velocity and position, in geographical coordinates, in real time.

When the aircraft in which the subject invention is installed is in motion, the aircraft is subjected to a specific force vector F (not illustrated) represented by orthogonal components $F_{xl}$, $F_{yl}$ and $F_{zl}$ coinciding with a local level coordinate frame $X_l$, $Y_l$, $Z_l$ ($Z_l$ passes through earth center). Force $F_{xl}$ causes axis 23 to be displaced from axis $Z_l$ by angle $\eta$ at an angular velocity $\dot{\eta}$, and force $F_{yl}$ moves gimbal axis 17 from axis $Y_l$ by an angle $\xi$ at an angular velocity $\dot{\xi}$. The axis disturbances excite gyro output signals in terminals 26 and 27 that are representative of $\dot{\eta}$ and $\dot{\xi}$, respectively. Signal $\dot{\eta}$ is integrated in integrator 37 and amplified in amplifier 38. The amplifier output energizes torquer 14 and moves the inner gimbal structure so as to bring $\eta$ to zero. Similarly, signal $\dot{\xi}$ is integrated in integrator 42 and amplified in gain amplifier 43. The amplifier output signal energizes torque generator 8 and causes the two-axis gimbal assembly to rotate about axis $x_b$ to reduce $\xi$ to zero. The output of amplifier 38, signal $F_{xGc}$ (standing for specific force along the x axis of the GIMU coordinate frame), is proportional to $F_{xl}$. Likewise output signal $F_{yGc}$ from amplifier 43 is proportional to specific force $F_{yl}$. Inasmuch as the servos keep pendulum axis 23 aligned with axis $Z_l$, vertical force $f_{zl}$ does not exert a torque on the pendulum and it is not measured.

The angular displacement between aircraft axis $x_b$ and $X_l$ is pitch angle $\theta$ and it is measured by signal generator 16. The pitch angle and other measured parameters may be viewed on display 75. The angle between aircraft axis $y_b$ and $Y_l$ represents the roll angle $\phi$ of the aircraft and it is measured by signal generator 9 and indicated on display 75. The typical prior art vertical gyro has erection sensors that cannot distinguish between gyro tilt and horizontal acceleration. These gyros are usually disabled during aircraft turns to avoid large acceleration-dependent drift rates. In contradistinction, in accordance with the subject invention, the pitch and roll measurements of the aircraft coordinate system are precise and acceleration insensitive.

Figure 2:
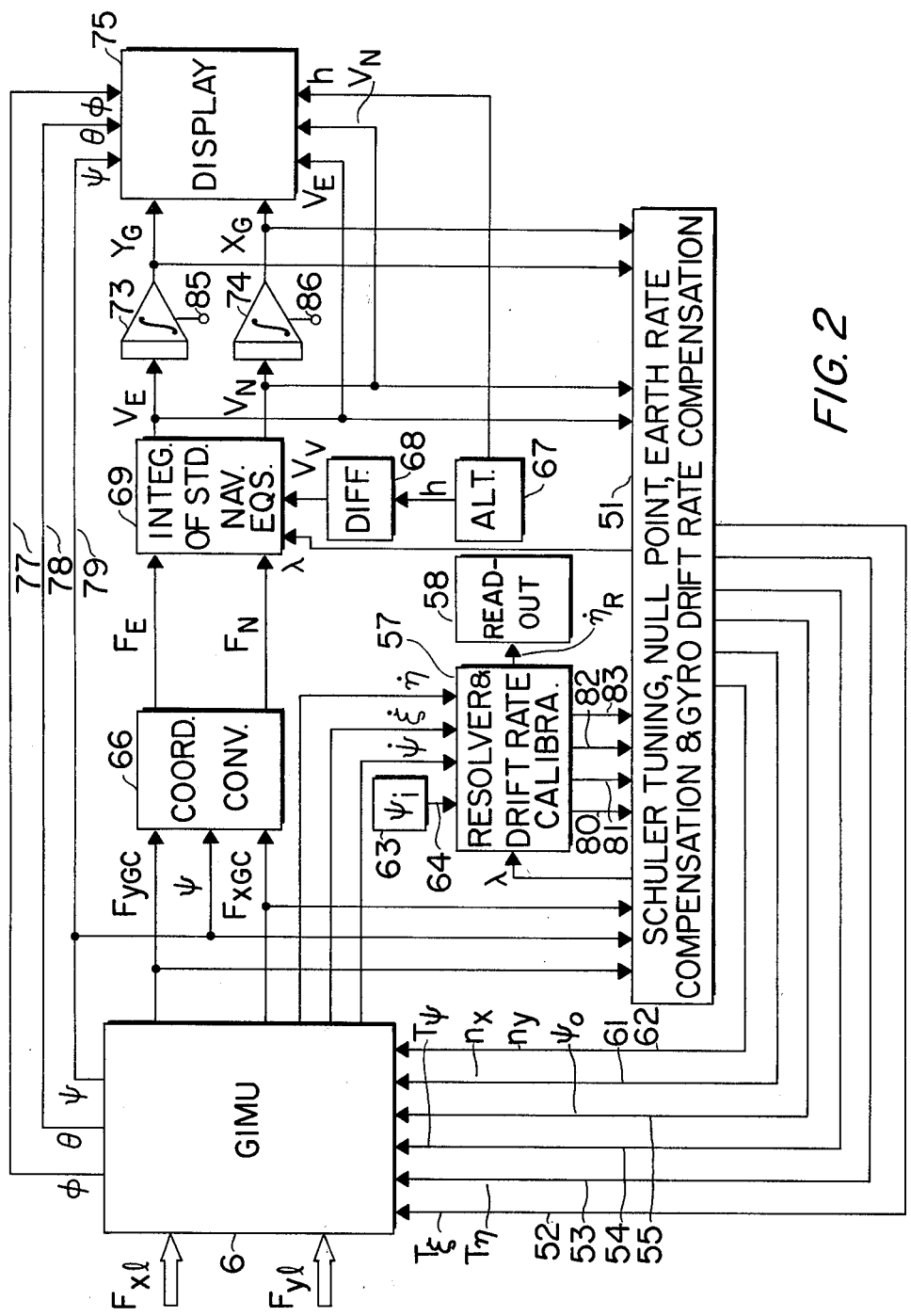
FIG. 2 is a schematic diagram of the complete autonomous navigation system.

FIG. 2 depicts a complete diagram of the instant navigation system. The GIMU signals $F_{yGc}$ and $F_{xGc}$, corresponding to the y and x specific force components in the GIMU local level coordinate frame are inputed to a coordinate converter 66 along with heading signal $\psi$. The coordinate converter performs a single conventional Euler angle transformation to convert the local level coordinate system specific force components to force components in a geographical coordinate frame comprising north (N), east (E) and vertical axes. Specifically, converter 66 performs the following transformation:

$$\begin{bmatrix} F_E \\ F_N \end{bmatrix} = \begin{bmatrix} \cos\psi & -\sin\psi \\ \sin\psi & \cos\psi \end{bmatrix} \begin{bmatrix} F_{yGc} \\ F_{xGc} \end{bmatrix}$$

A signal $V_V$, representative of the vertical velocity of the aircraft is developed by an altimeter/differentiator combination. An altitude signal h is generated by altimeter 67, differentiated by differentiator 68 and fed to 69 along with converter output signals $F_E$ and $F_N$ and a signal λ, representative of latitude, generated by circuit 51. Circuit 69 generates signals $V_N$ and $V_E$ representative of the velocity of the aircraft along the north (N) and east (E) geographical axes. It does so by integrating the standard navigation equations for $\dot{V}_N$ and $\dot{V}_E$. One of the many places where these equations are found is page 75 of "Integrated Aircraft Navigation," James L. Farrell, Academic Press, 1976.

Velocity signals $V_E$ and $V_N$ are integrated by integrators 73 and 74, respectively, producing geographical position signals $Y_G$ and $X_G$, respectively. $Y_G$ is the position of the aircraft on the east-west or Y axis of the geographical coordinate frame, and $X_G$ is the position of the aircraft or the north-south or X axis of the coordinate frame. Signals representative of the initial aircraft geographical coordinates are applied to the integrators at terminals 85 and 86. The $\phi$, $\theta$, and $\psi$ signals are carried from GIMU 6 to display 75 by leads 77, 78 and 79, respectively. The roll, pitch and heading of the aircraft are presented on display 75 along with aircraft velocities $V_E$, $V_N$, aircraft positions $Y_G$, $X_G$, and altitude h.

In the GIMU, geographical north (N) can be determined very quickly. Prior to usage of the subject navigation system, the north calibration process is initiated on the ground with switches 36 and 41 open. This of course deactivates the servo loops that position pendulum 25. With the torquers 8 and 14 deactivated, pendulum axis 23 quickly seeks alignment with $Z_l$. Due to the rotation of the earth, $\dot{\xi}$ and $\dot{\eta}$ signals are generated at the outputs of leveling gyroscope 22. The reaction torques resulting from the earth's rotation (in the order of $10^{-3}$ gram-cm) and the torques resulting from gimbal bearing friction (in the order of 0.05 gram-cm) do cause a very slight deviation of the pendulum axis from the vertical; however, they have a negligible effect on the north calibration process.

Resolver and drift rate calibrator 57 permits the accurate determination of true north (N) with respect to the instant direction of the longitudinal axis $x_l$, i.e. $\psi_o$, and determines turn on-to turn on drift rate signals $\dot{\xi}_d$, $\dot{\eta}_d$ and $\dot{\psi}_d$. Signals $\dot{\psi}$, $\dot{\xi}$ and $\dot{\eta}$ are inputed to circuit 57 from GIMU 6. In addition, circuit 57 receives a $\psi_i$ signal from generator 63 on lead 64 and a signal proportional to latitude, λ, from circuit 51. The signals $\dot{\xi}$ and $\dot{\eta}$ are proportional to $\Omega \cos\lambda \cos\psi_o$ and $\Omega \cos\lambda \sin\psi_o$, respectively, wherein λ is latitude and $\Omega$ is the earth rotation rate. These signals are resolved in circuit 57 as $\psi_i$ is varied in accordance with $$\begin{bmatrix} \dot{\xi}_R \\ \dot{\eta}_R \end{bmatrix} = \begin{bmatrix} \cos\psi_i & \sin\psi_i \\ -\sin\psi_i & \cos\psi_i \end{bmatrix} \begin{bmatrix} \cos\psi_o \\ \sin\psi_o \end{bmatrix} \Omega\cos\lambda =$$

$$\begin{bmatrix} \cos(\psi - \psi_i) \\ \sin(\psi - \psi_i) \end{bmatrix} \Omega\cos\lambda$$

When the $\dot{\eta}_R$ output from resolver 57 is zero on readout 58, then $\psi_i = \psi_o$.

The particular value of $\psi_i$ that made $\dot{\eta}_R=0$ is proportional to $\psi_o$ and it is used to set the initial value for the integration performed by integrator 33. Before reaching integrator 33, the $\psi_o$ signal is routed to tuning and compensation circuit 51 on lead 80. In circuit 51 the signal receives a compensation factor that accounts for the drift of azimuth gyroscope 21. The compensated $\psi_o$ signal reaches GIMU 6 via lead 55. After $\psi_o$ is established by the foregoing procedure, switches 36 and 41 are closed. Signals $F_{xGc}$ and $F_{yGc}$ should each be zero at the time of calibration. Signals $n_x$ and $n_y$, developed in circuit 51 and carried to amplifiers 38 and 43 via leads 61 and 62, respectively, null out any unwanted output signals. Furthermore, during flight, circuit 51 generates a signal on lead 61 that compensates for unwanted reaction torques of gyroscope 21 in consequence of yaw rate $\dot{\psi}$. This compensation signal is proportional to the product of the known values $\dot{\psi}$ and the angular momentum of gyroscope 21.

After the north calibration process is completed and $\psi_o$ has been determined, any subsequent azimuth change of the aircraft (and the GIMU which is hinged thereto) will cause gyroscope 21 to generate a heading rate signal $\dot{\psi}$ at output 32. Signal $\dot{\psi}$ is integrated by integrator 33 and the heading $\psi$ of the aircraft is constantly monitored on display 75 which is coupled to the output of integrator 33 via lead 79.

It is well known that drift rate and earth rotation rate errors are inherent in a gyro-stabilized platform. It is further well known how to derive compensatory torque commands to counteract these errors. Since Maxmilian Schuler's article "Aberration of Pendulum and Gyroscope Instruments Due to Acceleration of the Transporting Craft" appeared in 1923, it is common to "Schuler tune" pendulums and gyro-stabilized platforms. Herein, conventional earth rate, gyro drift rate, and "Schuler" compensation signals $T_\xi$, $T_\eta$, $T_\psi$ are generated in circuit 51 and distributed to the torque generators in gyroscopes 21 and 22 via leads 52, 53, and 54. The inputs to 51 for determining the Schuler tuning signals are $V_E$, $V_N$ and $\psi$ with g, the gravity constant and $R_E$, the radius of the earth, as known parameters. A single coordinate frame transformation (from geographical to local level) is implemented and torque command signals proportional to $V_E/R$ and $-V_N/R$ (wherein $R=R_E+h$) are transmitted to gyroscope inputs 28 and 29 by means of leads 53 and 52 respectively. As a result of these torque commands, pendulum 25 acts as a Schuler pendulum and maintains the local vertical throughout the entire flight mission. As used herein, signals $T_\xi$, $T_\eta$ and $T_\psi$ represent the collective compensatory torque command signals generated by 51 and transmitted to the azimuth and leveling gyroscopes via leads 52-54. That is, the Schuler tuning signals are summed with the drift rate compensation signals, etc. The inputs to 51 for determining gyro acceleration sensitivity compensation signals are $F_{yGc}$ and $F_{xGc}$ with the gyro acceleration drift rate-sensitivity coefficients as known compensation parameters. In circuit 57 the drift rates for gyroscope 22 are determined by:

$$\begin{bmatrix} \dot{\xi}_d \\ \dot{\eta}_d \end{bmatrix} = - \begin{bmatrix} \cos\psi_o & \sin\psi_o \\ -\sin\psi_o & \cos\psi_o \end{bmatrix} \begin{bmatrix} \dot{\xi}_R \\ \dot{\eta}_R - \Omega\cos\lambda \end{bmatrix}$$

The azimuth gyroscope 21 is subjected to the earth rate component $\Omega \sin \lambda$ wherein $\Omega$ is the sideral rate of rotation of the earth and $\lambda$ is latitude. The gyroscope output at terminal 32 is $\dot{\psi} = \Omega \sin \lambda - \dot{\psi}_d$ is its drift rate. $\dot{\psi}_d$ is thus obtained in resolver/calibrator 57 by subtracting the known quantity $\Omega \sin \lambda$. The drift rate signals $\dot{\xi}_d$, $\dot{\eta}_d$ and $\dot{\psi}_d$ produced in calibrator 57 are carried to circuit 51 by leads 81, 82 and 83, respectively. These signals are scaled in circuit 51 to provide drift rate compensation torque command signals that are fed to GIMU 6 via leads 52, 53 and 54. The latitude signal $\lambda$ for resolver/calibrator 57 and integrator 69 is generated in circuit 51 by solving $$\lambda = \int \frac{V_N}{R} dt$$

wherein $V_N$ is acquired from circuit 69 and R is the distance of the vehicle from the center of the earth ($R_E+h$). The computations performed by circuits 51, 57, 66, 69, 73, and 74 are preferably performed by a digital computer such as a microprocessor or a minicomputer.

In instances where higher accuracy is desired, the torques due to gimbal bearing friction can be readily modeled and appropriate compensating torque command signals can be generated and applied to the gimbal torquers. In order to eliminate the effect of gimbal bearing stiction on the null point accuracy of the GIMU, a periodical dither signal of a frequency of approximately 5 Hz can be applied to the leveling gyroscope torquers to linearize the output characteristics. The angular amplitude resulting from the dither signal would be in the order of a few mRad.

The instant navigation system has a multiplicity of advantages over conventional autonomous navigation systems. Inasmuch as only two gyroscopes and no accelerometers or stable platforms are required in the system, substantial savings in cost and instrumentation package size are achieved. In a strapdown type inertial navigation system all the gyroscopes and accelerometers must be of high quality and a high speed, large memory, digital computer is necessary to perform the many integrations and transformations. Herein, any one of a number of off-the-shelf low cost microprocessors can be utilized to perform all the transformations, integrations and compensations. Whereas in a conventional strapdown inertial system the gyros must be of comparable high quality, in the subject invention the azimuth gyroscope 21 can have a drift rate uncertainty of the order of ten times as large as that of leveling gyroscope 22. For example, in order to achieve an accuracy of one nautical mile for a mission of an hour, gyroscope 21 and 22 should have random drift rates not more than 0.1 deg/hr and 0.01 deg/hr, respectively.

Inasmuch as the essential measurement derives from gyroscope 22, the dominant error of the system primarily stems from a single source and the errors attributable to that source are basically drift rate and initial leveling errors. This improves null point precision. Because the essential specific force components $F_{xGc}$ and $F_{yGc}$ are derived from a single sensor (gyroscope 22), the difficulties associated with mechanical alignments of accelerometer and gyroscope triads are obviated. As the spin axis of gyroscope 22 is always maintained vertical, the GIMU is insensitive to yaw motions. Because no accelerometers are present in the GIMU, bias errors due to correlated noise signals in the gyros and accelerometers are avoided.

In conventional navigation systems, gimballed or strapdown, true north is determined by a relatively time consuming gyro-compassing process. In a typical strapdown or gimballed system it is not unusual to spend in the order of fifteen minutes performing the north calibration. In contradistinction, in the present invention the determination of true north is essentially instantaneous by virtue of the rapid leveling of the open loop pendulous system.

It will be apparent that the embodiment shown is only exemplary and that various modifications can be made in construction and arrangement within the scope of the invention as defined in the appended claims.

I claim:

1. Apparatus for measuring local level specific force components on a vehicle comprising:
    a two-degree of freedom pendulum including a two-degree-of-freedom leveling gyroscope, said pendulum adapted to be supported by said vehicle and having an axis passing through its center of gravity;
    means for torquing said pendulum about x and y orthogonally disposed axes in the local level plane;
    means including said leveling gyroscope for generating torque command signals for energizing said torquing means and causing said pendulum axis to align with the local vertical, said torque command signals being proportional to the specific force components along the x and y axes.

2. Apparatus for measuring local level specific force components on a vehicle comprising:
    a gyro-stabilized two-degree of freedom pendulum including an inner gimbal rotatably supported by an outer gimbal adapted to be strapped to the longitudinal axis of said vehicle, said pendulum having an axis normal to the axis of rotation of said inner gimbal;
    means for generating signals proportional to the angular velocities with which said pendulum axis deviates from the local vertical about x and y orthogonal axes in the local level plane;
    means for torquing each gimbal;
    means coupled between said generating means and said torquing means for integrating and amplifying said angular velocity signals and producing torque command signals for energizing said torquing means, said torque command signals being proportional to the specific force components on said vehicle along said x and y axes.

3. Apparatus for measuring local level specific force components on a vehicle comprising:
    a gimbal system having an inner gimbal rotatably supported by an outer gimbal, said gimbal system being adapted to be rotatably supported by said vehicle with the axis of rotation of said outer gimbal being coincident with the longitudinal axis of said vehicle;
    a two-degree of freedom leveling gyroscope affixed to said inner gimbal, said gyroscope and said gimbal system having a center of gravity below the axis of rotation of said inner gimbal, said gyroscope and said gimbal system comprising a pendulum with an axis perpendicular to the axis of rotation of said inner gimbal;
    means for torquing said pendulum about x and y orthogonally disposed axes in the local level plane;
    means for generating torque command signals for energizing said torquing means and causing said pendulum axis to align with the local vertical, said torque command signals being proportional to the specific force components along the x and y axes.

4. Apparatus as set forth in claim 3 wherein said leveling gyroscope includes two orthogonally disposed torquers and said torquers are driven with signals proportional to $V_E/R$ and $-V_N/R$, respectively, wherein $V_E$ is the vehicle velocity in the east direction, $V_N$ is the vehicle velocity in the north direction and R is the distance from the vehicle to the center of the earth.

5. Apparatus for measuring local level specific force components on a vehicle comprising:
    a gimbal system having an inner gimbal rotatably supported by an outer gimbal, said gimbal system being adapted to be rotatably supported by said vehicle with the axis of rotation of said outer gimbal being coincident with the longitudinal axis of said vehicle;
    a two-degree of freedom leveling gyroscope affixed to said inner gimbal, said gyroscope and said gimbal system having a center of gravity below the axis of rotation of said inner gimbal, said gyroscope and said gimbal system comprising a pendulum with an axis perpendicular to the axis of rotation of said inner gimbal;
    means in said gyroscope for generating signals proportional to the angular velocities with which said pendulum axis deviates from the local vertical about x and y orthogonal axes in the local level plane;
    means for torquing each gimbal;
    means coupled between said generating means and said torquing means for integrating and amplifying said angular velocity signals and producing torque command signals for energizing said torquing means, said torque command signals being proportional to the specific force components on said vehicle along said x and y axes.

6. Apparatus as set forth in claim 5 wherein said leveling gyroscope includes two orthogonally disposed torquers and said torquers are driven with signals proportional to $V_E/R$ and $-V_N/R$, respectively, wherein $V_E$ is the vehicle velocity in the east direction, $V_N$ is the vehicle velocity in the north direction and R is the distance from the vehicle to the center of the earth.

7. A vehicle navigation system comprising:
    a two-degree of freedom gyro-stabilized pendulum adapted to be supported by said vehicle and having an axis passing through its center of gravity;
    means for torquing said pendulum about x and y orthogonally disposed axes in the local level plane;
    means for generating torque command signals for energizing said torquing means and causing said pendulum axis to align with the local vertical, said torque command signals being proportional to the specific force components along the x and y axes;
    means for generating a signal proportional to the heading of said vehicle;
    means coupled to said torque command signals and said heading signal for producing signals proportional to the specific force components along orthogonally disposed axes in a geographical coordinate system;
    means for generating a signal proportional to the vertical velocity of said vehicle;
    means coupled to said vertical velocity signal and said geographical coordinate system specific force signals to produce signals proportional to the vehicle velocities in the north and east directions; and means for integrating said velocity signals to produce vehicle position signals referenced to a geographical coordinate system.

8. A vehicle navigation system comprising:
a gyro-stabilized two-degree of freedom pendulum including an inner gimbal rotatably supported by an outer gimbal adapted to be strapped to the longitudinal axis of said vehicle, said pendulum having an axis normal to the axis of rotation of said inner gimbal;
means for generating signals proportional to the angular velocities with which said pendulum axis deviates from the local vertical about x and y orthogonal axes in the local level plane;
means for torquing each gimbal;
means coupled between said generating means and said torquing means for integrating and amplifying said angular velocity signals and producing torque command signals for energizing said torquing means, said torque command signals being proportional to the specific force components on said vehicle along said x and y axes;
means for generating a signal proportional to the heading of said vehicle;
means coupled to said torque command signals for producing signals proportional to the specific force components along orthogonally disposed axes in a geographical coordinate system;
means for generating a signal proportional to the vertical velocity of said vehicle;
means coupled to said vertical velocity signal and said geographical coordinate system specific force signals to produce signals proportional to the vehicle velocities in the north and east directions; and
means for integrating said velocity signals to produce vehicle position signals referenced to a geographical coordinate system.

9. A system as claimed in claim 8 further including means for simultaneously displaying the vehicle's pitch, roll, yaw, altitude, velocity and position.

10. A system as set forth in claim 8 wherein a resolver is included for heading calibration.

11. A system as set forth in claim 10 wherein said pendulum includes a leveling gyroscope generating rate signals $\dot{\xi}$ and $\dot{\eta}$;
means for generating a signal proportional to $\psi_i$;
means for coupling said $\dot{\xi}$, $\dot{\eta}$, and $\psi_i$ signals to said resolver which performs $$\begin{bmatrix} \dot{\xi}_R \\ \dot{\eta}_R \end{bmatrix} = \begin{bmatrix} \cos\psi_i & \sin\psi_i \\ -\sin\psi_i & \cos\psi_i \end{bmatrix} \begin{bmatrix} \cos\psi_o \\ \sin\psi_o \end{bmatrix} \Omega\cos\lambda =$$

$$\begin{bmatrix} \cos(\psi - \psi_i) \\ \sin(\psi - \psi_i) \end{bmatrix} \Omega\cos\lambda$$

wherein $\dot{\xi}_R$ and $\dot{\eta}_R$ are the resolver outputs, $\psi$ is the heading angle subtended by the vehicle longitudinal axis and north, $\psi_o$ is the heading angle at the time of calibration, $\lambda$ is latitude, $\Omega$ is the earth rotation rate, and $\psi_i = \psi_o$ when $\dot{\eta}_R = 0$.

* * * * *